Patented June 18, 1935

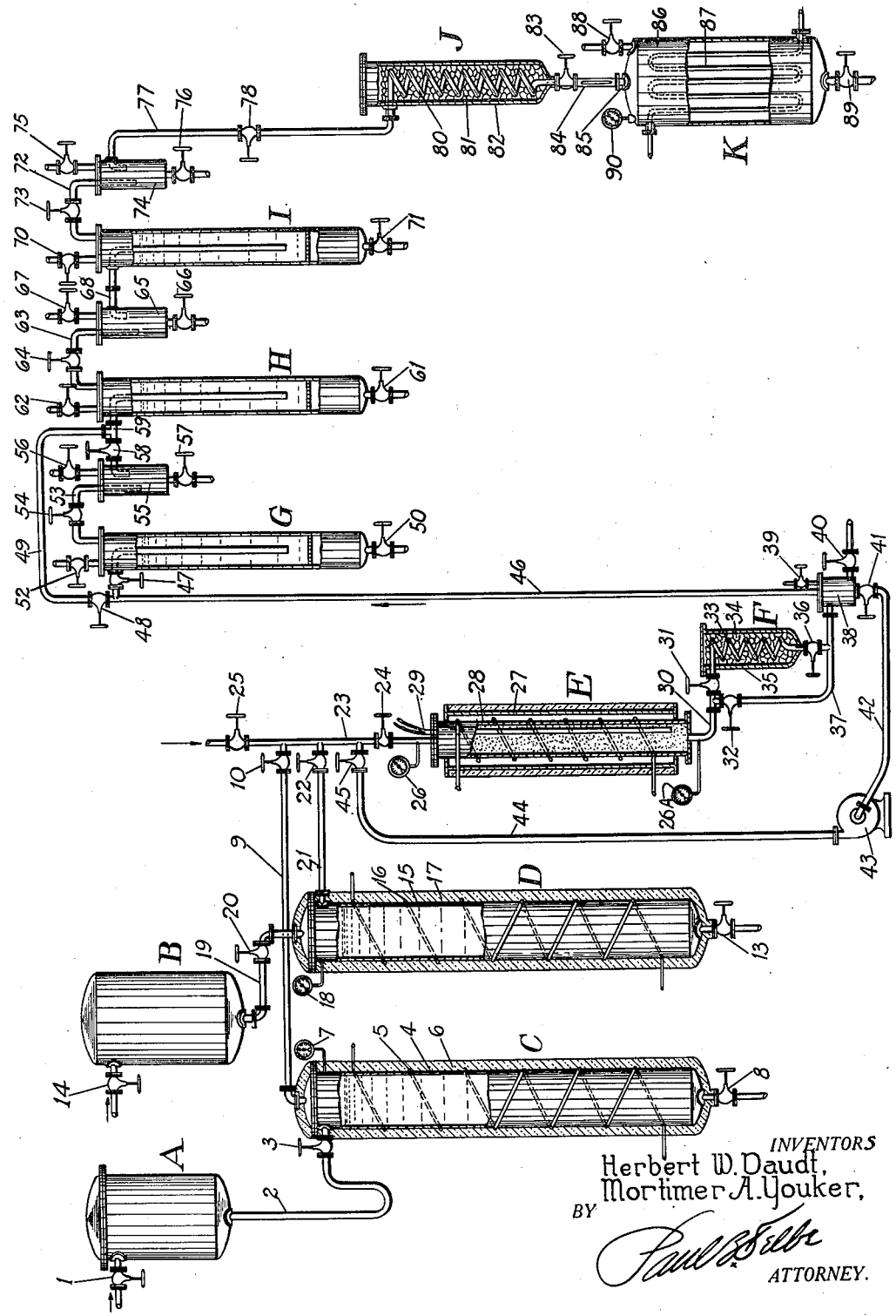

2,005,707

UNITED STATES PATENT OFFICE 2,005,707

PRODUCTION OF ORGANIC FLUORINE COMPOUNDS

Herbert Wilkins Daudt and Mortimer Alexander Youker, Wilmington, Del., assignors to Kinetic Chemicals Inc., Wilmington, Del., a corporation of Delaware Application August 31, 1932, Serial No. 631,162

26 Claims. (Cl. 260—166)

This invention relates to organic fluorine compounds, more particularly fluorinated derivatives of acyclic hydrocarbons, and processes for the production thereof.

An object of the invention is to provide a new and improved process for the preparation of organic fluorine compounds. Another object is the provision of a vapor phase process for the production of fluorinated organic compounds. A further object is the production of acyclic hydrocarbon derivatives containing fluorine by a fluorination reaction which proceeds smoothly and, if desired, continuously without undesirable side reactions. A still further object is the provision of new and improved fluorinating catalysts which are cheaply obtainable and efficient in operation. An additional object is the production of new organic fluorine compounds. Other objects will appear hereinafter.

These objects are accomplished according to the broader aspects of the invention by reacting together a fluorinating agent and a compound containing one or more acyclic carbon atoms attached to one or more halogen atoms other than fluorine, in the presence of a metal halide catalyst, preferably impregnated on a support.

For convenience, the invention is illustrated by the processes hereinafter described and the apparatus shown in the accompanying drawing, in which similar characters refer to similar parts.

In the arrangement of apparatus shown, the fluorination reaction is effected in a reactor such as illustrated at E. This may be done conveniently by placing in reactor E a metal halide catalyst, heating the catalyst to the desired reaction temperature and then simultaneously adding thereto a fluorinating agent, such as hydrogen fluoride, and an acyclic halogen derivative which is to be fluorinated. Vaporizers such as are generally indicated at C and D are provided to gasify the hydrogen fluoride and acyclic halogen derivative prior to passage through the catalyst.

The gaseous fluorinated product together with any other substances which may be present therein, such as hydrogen halides and unconverted acyclic halogen derivatives, is then passed into a preliminary condenser such as shown at F which may be maintained at a temperature sufficient to condense at least a part of the unconverted reactants, products or mixtures thereof. If desired, the liquefied materials thus obtained may be recycled for use as starting materials.

The gases from the preliminary condenser are led into a scrubber or scrubbers filled with some material capable of removing hydrogen halides. This may conveniently be done by passing the gases into a water scrubber such as indicated at G and then into a container filled with a solution of caustic alkali, milk of lime or the like, such as shown at H. Where aqueous scrubbing agents of the character described are used to remove hydrogen halides from the fluorinated product, the gas will become mixed with water vapors. Subsequently, it may be conveniently dried by passing it through a drying scrubber such as shown at I. This scrubber will ordinarily contain sulfuric acid, stick caustic or the like. For convenience of storage and transportation, the resultant fluorinated product may be liquefied. This liquefaction may be accomplished by passing the gaseous product through a condenser, such as shown at J. Following its condensation, the liquefied product may be run into a storage container, such as illustrated at K.

In carrying out the fluorination process, it will be recognized that various modifications may be made in the exact manner of procedure. Thus, the gaseous fluorinated product from the catalyst tube may be passed directly into the scrubbers for removal of hydrogen halides without going through the preliminary condenser F. Also, the gaseous fluorinated product may be passed directly into scrubber H containing the alkaline reagent without being introduced into the water scrubber G.

The invention will be more fully understood by reference to the following detailed description. For convenience, the process is described in connection with specific substances, namely hydrogen fluoride (the fluorinating agent), carbon tetrachloride (the acyclic halogen compound) and ferric chloride impregnated on charcoal (the catalyst).

Referring to the drawing, hydrogen fluoride is introduced in the vaporizer C from weigh-tank A, through line 2 and valve 3. Weigh-tank A is equipped with a valved inlet 1. Vaporizer C consists of a container 4 surrounded by heating coils 5 and lagging 6 and provided with a pressure gauge 7 and a valved bottom outlet 8.

Carbon tetrachloride is introduced from weigh-tank B into vaporizer D through line 19 and valve 20. Weigh-tank B is provided with a valved inlet 14. Vaporizer D is similar in construction to vaporizer C and consists of a container 15 surrounded by heating coils 16 and lagging 17 and provided with a pressure gauge 18 and a valved outlet 13. Under ordinary operating conditions the valves 8 and 13 are closed.

Gaseous carbon tetrachloride from vaporizer

D passes through line 21 and valve 22 into line 23 and there mixes with hydrogen fluoride vapor introduced into line 23 from vaporizer C through line 9 and valve 10. The gaseous mixture then passes through valve 24 into the reactor E containing therein a suitable amount of the ferric chloride-charcoal catalyst maintained at the desired reaction temperature. If desired, a halogen and/or the reactants, compressed or otherwise, may be introduced into the reactor by way of valved inlet 25, line 23 and valve 24.

The reactor E consists of a tube 28 provided with heating means such as, for example, an electrical furnace 27 and a thermo-couple or other suitable temperature indicating device 29. The catalyst is disposed on the inside of the tube 28. This tube may or may not be full of catalyst. Thus a part of the space may be free or occupied by a material which has no catalytic effect. The inlet and outlet pressures are determined by means of gauges 26 and 26A respectively.

It is probable that the reaction taking place in reactor E produces some of each of the compounds: $CCl_3F$, $CCl_2F_2$ and $CClF_3$. In any event, by proper regulation of conditions such as temperature and pressure of the reaction, time of contact of the reactants with the catalyst and relative proportions of the ingredients, etc., the production of the desired compound or compounds is maintained at a maximum.

The mixture of the fluorinated product (which itself may or may not be a mixture), and hydrogen chloride containing any unconsumed carbon tetrachloride and hydrogen fluoride leaves the reactor E through line 30. The mixed gases passed through valve 31 (valve 32 being closed) into a preliminary condenser F comprising coils 33, surrounded by suitable refrigerant indicated at 34 and held in container 35. The condenser temperature is regulated to liquefy a part of the unconverted reactants and, if desired, some of the reaction products. The liquid product and the gaseous fluorinated product and hydrogen halide then pass through valve 36 and line 37 into trap 38. This trap is provided with a valved vent 39 and two bottom outlets controlled by valves 40 and 41. Liquids falling to the bottom of the trap may be removed through the outlet 40; or, if desired, may be passed through valve 41 and line 42 to pump 43, and recycled through line 44 and valve 45 for use again in the process. This circulation may be intermittent or continuous as desired.

The gaseous fluorinated product and hydrogen halides leave trap 38 through line 46 and pass through valve 47 (valve 48 being closed) into a water scrubber G. This scrubber is provided with a valved inlet 52 and a valved outlet 50 which may be regulated as desired. By passage of the gases through this scrubber some of the hydrogen halides are removed. The remaining gases pass through line 53 and valve 54 into a trap 55 provided with a valved vent 56 and a valved outlet 57. From trap 55 the gases pass through valve 58 and line 59 into a scrubber H containing a body of aqueous alkali metal hydroxide. This scrubber is of the circulating type. It has a bottom outlet through valve 61 and may be filled through a valved inlet 62.

The substantially neutral gas leaves scrubber H through line 63 and valve 64 and passes through trap 65 into line 68. This trap has a bottom outlet through valve 66 and a vent through valve 67. From line 68 the gas passes through a quantity of drying material (for example, sulfuric acid in scrubber I). Scrubber I is also of the circulating type having a valved inlet 70 and a bottom outlet through valve 71.

The dry neutral gas leaves scrubber I through line 72 controlled by valve 73 and passes through a trap 74 provided with a vent through a valve 75 and a bottom outlet through valve 76. From trap 74 the gas passes through line 77 and valve 78 to a condenser J comprising a coil 80 surrounded by a suitable refrigerant indicated at 81 in container 82. The condensate passes through valve 83, sight-glass 84 and line 85 into a storage unit generally indicated at K. The illustrated storage unit comprises a storage vessel 86 cooled to the proper temperature by a suitable refrigerant such as, for example, carbon dioxide circulated in coils 87. The storage vessel is also provided with a valved vent 88, a valved outlet 89 and a pressure gauge 90.

As previously indicated, according to a modification of the above described process, the gaseous products from reactor E may be treated directly for the removal of hydrogen halides without preliminary condensation in condenser F. This may be conveniently effected by closing valves 31 and 36 and opening valve 32, thereby allowing the reaction products to pass directly through valve 32 and line 37 into trap 38. Whether or not the preliminary condenser F is by-passed in the manner described it may be desirable, according to another modification of the process, to by-pass water scrubber G and thereby introduce the reaction products directly into scrubber H where they are treated with an alkaline reagent. This may be conveniently accomplished by closing valves 47 and 58 and opening valve 48. As a result, the gaseous fluorinated product in line 46 passes through valve 48 into line 49 and thence into line 59 and scrubber H, by-passing scrubber G and trap 55.

As another modification of the process, the crude gaseous fluorinated product from reactor E may be scrubbed through a liquid consisting of the material being fluorinated or of some intermediate fluorinated product maintained at a suitable temperature. This may be accomplished, for example, by replacing the preliminary condenser F by a scrubber (not shown) partially filled with carbon tetrachloride (or other raw material to be fluorinated). Circulation of the scrubbing liquid from the scrubber to the reactor may be effected by a pump in the manner described for circulation of the condensate from the preliminary condenser F to reactor E.

It will be understood that other expedients and varying methods of procedure of a character apparent to those skilled in the art may be employed. The forms of apparatus shown are merely conventionally illustrated and may vary widely in details well known in the industry. Other suitable scrubbers such as those of the non-circulating type may be employed. Obviously, the various traps should be sufficiently large to collect liquids which may escape or flow from the scrubbers or condensers.

Portions of the apparatus which come into contact with hydrogen halides during the reaction have usually been constructed or lined with some corrosion resistant material, such as copper, a chromium alloy steel, molybdenum-containing alloy steel, and Monel metal. Steel has given reasonably satisfactory service. The construction of the apparatus or those portions thereof which are in contact with the fluorination reaction mixture from materials containing iron is apparently novel and has many advantages. The discovery that the process may be operated satisfactorily with apparatus constructed of mild steel, chromium alloy steels and molybdenum alloy steels is particularly valuable because of the fact that these materials of construction will withstand high temperatures and superatmospheric pressures much better than materials such as copper. In certain instances it may be desirable to construct the hydrogen halide removers of phenol-formaldehyde condensation products, of lead or similar material. After the corroding materials have been removed from the gas stream ordinary materials of construction may be used, for example, cast iron, wrought iron, steel and the like.

The invention will be further understood from the consideration of the following examples, in which the parts are given by weight.

Example I

Gaseous hydrogen fluoride and carbon tetrachloride in proportions corresponding to about 20 parts of hydrogen fluoride and 300 parts carbon tetrachloride were hourly passed through 300 parts of a mixture of 90% charcoal and 10% cuprous chloride disposed in a chromium alloy steel tube having a length approximately 10 times its diameter. The catalyst was maintained at a temperature of 250° C. by means of external electrical heating coils.

The gases after passage through the catalyst consisted chiefly of hydrogen chloride, difluoro-dichloro-methane, fluoro-trichloro-methane, hydrogen fluoride and carbon tetrachloride. The hydrogen chloride and hydrogen fluoride were largely removed by treatment with water. The gas stream was further purified by scrubbing through an aqueous 9-10% caustic solution and then through a 90-95% sulfuric acid solution. During the operation, the caustic and sulfuric acid scrubbers and the intermediate trap were held at a temperature of about 50° to 60° C. The product, condensed at a temperature of about −40° to −50° C. and recovered in liquid form, was then fractionally distilled to separate difluoro-dichloro-methane, fluoro-trichloro-methane and carbon tetrachloride. The overall-yield of fluorinated derivatives, based on hydrogen fluoride, was about 82%.

Example II

The vapors of 20 parts of substantially anhydrous hydrogen fluoride and 310 parts of carbon tetrachloride were hourly passed through 300 parts of a catalyst composed of charcoal and ferric chloride in an iron reactor similar in design to that described in Example I. The temperature of the catalyst was maintained at about 145-155° C. This catalyst was prepared by mixing one part of sublimed ferric chloride with ten parts of charcoal.

The mixture of gases leaving the catalyst consisted of hydrogen chloride, difluoro-dichloro-methane, fluoro-dichloro-methane and unreacted hydrogen fluoride and carbon tetrachloride. The gas mixture was passed through water which removed the greater part of the hydrogen halides. The gases were then further purified by washing with caustic soda solution and then drying with sulfuric acid (specific gravity 1.80). During five hours of continuous operation a yield of 88% of fluorine derivatives, based upon hydrogen fluoride, was obtained.

Example III

There were hourly added 120 parts of difluoro-dichloro-methane and 20 parts of hydrogen fluoride to 300 parts of a catalyst, consisting of 90% activated carbon and 10% cuprous chloride, and maintained within the temperature range 350°-450° C.

The exit gases consisted of a mixture of trifluoro-chloro-methane, difluoro-dichloro-methane, hydrogen chloride and hydrogen fluoride. The fluoro-chloro derivatives were purified by passing successively through water, aqueous sodium hydroxide solution and sulfuric acid (specific gravity 1.80 all of which were held at 20-30° C. The purified gases were, with the exception of a small amount of tri-fluoro-chloro-methane, liquefied by means of a condenser, maintained at about −75° C.

The uncondensed material was collected in a gasometer. The liquid was subjected to suitable fractional distillation, whereupon it yielded trifluoro-chloro-methane (boiling point about −80° C.) and difluoro-dichloro-methane.

The yield of trifluoro-chloro-methane, based upon hydrogen fluoride, was 50-55%; the yield based upon consumed difluoro-dichloro-methane was essentially quantitative.

Example IV

To 300 parts of a catalyst consisting of 90% activated carbon and 10% cuprous chloride maintained at 300°-400° C., there were hourly added at a uniform rate 100 parts of carbon tetrachloride and 50 parts of hydrogen fluoride. The exit gases were purified and condensed in the same manner as in Example III.

The liquefied product consisted primarily of a mixture of trifluoro-chloro-methane and difluoro-dichloro-methane. Some fluoro-trichloro-methane was also recovered. The combined yield of fluoro derivatives, based on carbon tetrachloride, was above 90%; the yield, based on hydrogen fluoride, was above 70%.

Example V

Substantially anhydrous hydrogen fluoride was allowed to vaporize and the vapors passed through trifluoro-trichloro-ethane heated to a temperature of about 42° C. The mixture of vapors was then passed through a column of pieces of porous fused alumina, impregnated with vanadium tetrachloride. The catalyst was contained in a tube constructed of a molybdenum-containing steel, and was maintained at a temperature of about 500° C. Hydrogen chloride, tetrafluoro-dichloro-ethane and penta-fluoro-chloro-ethane were produced.

The gas mixture was scrubbed with water and an aqueous alkali metal hydroxide solution and dried with sulfuric acid. On condensing the product in an alcohol-carbon dioxide ice bath, a liquid which boiled at about 0° C. was obtained. This liquid was a mixture of penta-fluoro-chloro-ethane, tetra-fluoro-dichloro-ethane and unconverted trifluoro-trichloro-ethane. Under the conditions of reaction approximately 50% of the hydrogen fluoride was utilized. The liquid mixture above described was subject to fractional distillation and the penta-fluoro-chloro-ethane ($C_2F_5Cl$) and tetra-fluoro-dichloro-ethane $$(C_2F_4Cl_2)$$

were isolated. Penta-fluoro-chloro-ethane which is apparently a new product and one not previously isolated boils at about −40° C. under atmospheric pressure. Tetra-fluoro-dichloro-ethane boils at about +4° C. under atmospheric pressure.

*Example VI*

Hydrogen fluoride was allowed to boil gently and the vapors passed through fluoro-trichloro-methane held at a temperature of about 20–25° C. The gaseous mixture of the two compounds was then passed through 400 parts of a heated column of porous fused alumina fragments impregnated with manganese chloride. The temperature of the catalyst was maintained at about 400° C. The rate of feed of hydrogen fluoride averaged about 20 parts per hour. The gases leaving the catalyst were washed consecutively with water, caustic and sulfuric acid. The remaining gases when condensed at a temperature of about −50° C. produced a colorless liquid which began to boil at about −25° C. This product was a mixture consisting largely of difluoro-dichloro-methane and fluoro-trichloro-methane. These two components were obtained in a pure state by fractional distillation of the above described mixture, the distillation preferably being carried out under super-atmospheric pressure. The yield of difluoro-dichloro-methane, based upon hydrogen fluoride, was about 74%.

According to the invention, halogens other than fluorine attached to acyclic carbon atoms may be replaced by fluorine. Where the acyclic carbon atom or atoms have attached thereto more than one halogen having an atomic weight greater than 19 (that is, greater than fluorine), the fluorination may be regulated to replace the desired number of halogen atoms. It will be recognized, that the invention is applicable to the fluorination of a large number of halogen-containing carbon compounds. As specific examples of such compounds may be mentioned methylene chloride ($CH_2Cl_2$), fluoro-trichloro-methane, ($CFCl_3$) ethyl chloride ($CH_3CH_2Cl$), ethyl bromide $CH_3$—$CH_2Br$), isopropyl bromide ($CH_3CHBrCH_3$), ethylene dibromide ($CH_2Br$—$CH_2Br$), tetrachloro-ethane ($CHCl_2$—$CHCl_2$), trichlor-ethylene ($CHCl=CCl_2$), chloroform ($CHCl_3$), bromoform ($CHBr_3$), iodoform ($CHI_3$), carbon tetrachloride ($CCl_4$), trifluoro-trichloroethane ($C_2F_3Cl_3$), dichloro-ethane ($C_2Cl_2H_4$), hexachloro-ethane $C_2Cl_6$), difluoro-tetrachloro-ethane ($C_2Cl_4F_2$), tetrachlor-ethylene ($Cl_2=CCl_2$)

and halogen derivatives of higher members of the aliphatic series. As further examples of compounds containing an acyclic carbon atom having attached thereto a halogen other than fluorine may be mentioned benzo-trichloride ($C_6H_5CCl_3$), benzo-difluoro-chloride ($C_6H_5CF_2Cl$), benzo-fluoro-dichloride ($C_6H_5CFCl_2$) and ring-substituted benzo-trichlorides containing substituents such as, for example, alkyl groups (methyl, ethyl, propyl, etc.) and halogens (e. g. chlorine and bromine). In fluorinating benzo-trichloride derivatives containing chlorine atoms in the aryl portion thereof, it has been noted that the chlorine atoms in the acyclic portion may be replaced by fluorine without affecting the chlorine atoms in the aryl portion. It will be understood that the operating conditions may vary widely depending largely upon the nature of the compound subjected to fluorination and the results desired. While halogens other than fluorine (including chlorine, bromine and iodine) attached to acyclic carbon atoms may be replaced by fluorine in accordance with this invention, the process has thus far been particularly advantageous in the fluorination of chlorine-containing acyclic hydrocarbon derivatives. The replacement of chlorine by fluorine is more difficult than that of either bromine or iodine. The term halogenated acyclic hydrocarbon is used throughout the specification and claims to mean acyclic hydrocarbons in which one or more or even all of the hydrogen atoms have been substituted or replaced by halogens.

Where the original acyclic halogen derivative contains hydrogen, a substitution of halogen for hydrogen may occur during the fluorination operation if a free halogen such as chlorine is present during the fluorination reaction. Examples of such reactions are those taking place when methylene chloride or tetrachloro-ethane are fluorinated.

When the original acyclic halogen derivative is unsaturated, the addition of halogen and the introduction of fluorine may take place in the same operation. For instance, fluoro-chloro derivatives of ethane may be prepared by passing tetrachlor-ethylene or trichlor-ethylene, hydrogen fluoride and chlorine through the catalyst under suitable conditions of temperature and pressure.

By the term "hydrogen fluoride", unless otherwise indicated, it is intended to include and to cover not only the pure product, but also hydrogen fluoride or hydrofluoric acid which may contain impurities, as for example, water.

The metal halide employed as the catalyst is preferably a halide of a heavy metal. It will be understood that by "heavy metal" is meant a metal having a specific gravity greater than 4. In general, very highly desirable results have been obtained in the use of metal chlorides as catalysts for the fluorination. Other halides, as for example, bromides or iodides, will function satisfactorily. The catalyst may originally be used in the form of a fluoride as, for example, silver fluoride. If desired, the catalyst may be a mixture of various metal halides. Also, the metal may be originally added in the form of some other compound, such as the acetate or oxide, which is convertible to a halide by a hydrohalide. It will be recognized that the original metal halide may be partially or completely changed to one or more other halides. For instance, if ferric bromide is used in the fluorination of carbon tetrachloride, it is likely that the resulting halide will be a mixture or combination of ferric chloride and ferric fluoride. In the case of certain metallic halides, such as those of gold, platinum and the other noble metals, the halide may be reduced to the metal and the catalytic efficiency may continue. Thus, we have found that metallic platinum supported upon an inert support or upon activated carbon functions as a fluorinating catalyst.

As previously indicated, the metal halide is preferably fixed on a support. The support may be a pervious body of rigid character, i. e., which is not disintegrated under the condition of reaction. It may be relatively inert or catalytically active. In practicing the invention, very highly desirable results have been obtained in the use of catalysts composed of one or more metal halides supported on relatively inert material such as porous fused alumina. Especially advantageous results have been obtained by carrying out the fluorination reaction with catalysts consisting of one or more metal halides supported on a material which itself is catalytically active, as for example carbon. It has been noted that, in general, a combination of a metal halide with carbon functions at a lower temperature than does either the halide or the carbon. This was shown by the fact that copper chloride upon porous fused alumina did not effectively fluorinate carbon tetrachloride below 400° C.; neither did a certain activated carbon. However, a combination of copper chloride and the same carbon gave excellent results at 250° C. It has been noted also that ferric chloride and carbon when used singly at 100–200° C. afforded only slight fluorinations of carbon tetrachloride. When used together, conversions of 70–90% of the hydrogen fluoride were obtained.

The carbon employed as a support for the metal halide may be of vegetable, animal or mineral origin. Charcoal prepared from various vegetable sources, bone char from bones, coke from petroleum, coal and the like and, in general, material consisting essentially of carbon and which has been prepared by the destructive distillation of organic material has been found to be satisfactory. The carbon, regardless of source and mode of preparation, should preferably have adsorptive properties. Very desirable results have been obtained in the use of the so-called activated carbons such as may be prepared in various well known ways, for instance, by heating carbon to high temperatures in the presence of air, steam, a halogen or an inert gas. Acid washed carbon has been used with satisfactory results.

The metal halide may be fixed on the support by various means. As illustrations of the methods which may be employed may be mentioned: (1) the support may be impregnated with the anhydrous metallic halide, as for example, vanadium chloride or zinc bromide; (2) the solid metallic halide may be mixed mechanically with the support; (3) the support may be impregnated with a solution of the metallic halide and the solvent evaporated; (4) the metallic halide may be distilled or sublimed on the support and (5) the metallic halide may be formed in the presence of the support by chemical action, e. g. ferric chloride may be prepared in the presence of activated carbon by treatment of heated iron with chlorine. Methods (4) and (5) or combinations thereof may be carried out simultaneously with the addition of the reacting components. For example, antimony pentahalides may be added to charcoal simultaneously with the addition of hydrogen fluoride and chloroform. Various other procedures may be employed. In any case, it is preferable that the catalyst should have a physical form of such character that it does not tend to form dust and pass out of the catalyst chamber with the gas stream. In general, it is desirable to prepare the catalyst in the form of small pieces, lumps or in pelleted form, with or without the use of a suitable binding agent. In many cases the metal chloride itself may serve as a binding agent. For example, the catalyst may be prepared from finely ground carbon by mixing it with an aqueous solution of calcium chloride and subsequently removing the water.

As specific examples of catalysts which have given desirable results in the practice of the invention, the following may be mentioned; silver chloride on porous fused alumina, cupric chloride on porous fused alumina, ferric chloride on porous fused alumina, vanadium chloride on porous fused alumina, manganese chloride on porous fused alumina, a mixture of mercuric chloride, manganese chloride, sodium chloride and copper chloride on porous fused alumina, a mixture of manganese chloride and silver chloride on porous fused alumina, a mixture of zinc chloride and calcium chloride on porous fused alumina, a mixture of ferric chloride, copper chloride and mercuric chloride on porous fused alumina, ferric chloride impregnated upon steel wool, and activated carbon in combination with one or more of the following compounds: an antimony chloride, a copper chloride, platinic chloride, mercuric chloride, a vanadium chloride, silver chloride, nickel chloride, cobalt chloride, cadmium chloride, calcium chloride, zinc chloride and an iron chloride.

The above specific catalysts may be classified in general as halides of metals of groups I, II, V, VII and VIII of the periodic system, this classification being as follows:

| Group I | Copper, silver, sodium |
| II | Cadmium, calcium, zinc, mercury |
| V | Vanadium, antimony |
| VII | Manganese |
| VIII | Iron, nickel, cobalt, platinum |

The flourination reaction is normally carried out with the reactants in the vapor phase when they are introduced into the catalyst. However, the temperature and pressure may be so adjusted that at least one of the reactants is in liquid phase when in contact with the catalyst. Hydrogen fluoride, for instance, is a liquid at a temperature of about 80° C. under a pressure of about 85 pounds per square inch.

The proportions of reactants contacted with the catalyst may vary within relatively wide limits depending largely upon the nature of the reactants, the conditions of operation and the results desired. Stoichiometrically, one equivalent of hydrogen fluoride corresponds to one equivalent of replaceable halogen in the compound to be fluorinated. In general, an excess of hydrogen fluoride favors the introduction of a larger number of fluorine atoms and an excess of the acyclic halogen compounds favors the introduction of a smaller number of fluorine atoms. As long as the reactants are in contact with the catalyst in suitable proportions, it matters little in what manner they are introduced. In practice, it is customary to introduce the reactants into the catalyst simultaneously. Alternatively, they may be added somewhat intermittently, preferably with the initial addition of the organic halogen derivative.

The temperature at which the reaction is effected may be varied over a wide range depending largely upon the nature of material to be fluorinated, the catalyst and other conditions of reaction. It is desirable, however, to carry out the reaction at a temperature below that at which decomposition of the reactants and/or products occur. In general, where the metal halide catalyst is fixed on a relatively inert support such as porous fused alumina, carbon tetrachloride is preferably fluorinated in accordance with the invention at a temperature of about 250°–450° C. and trifluoro-trichloro-ethane at about 450°–550° C. Where the catalyst is fixed on a support, such as activated carbon which in itself is catalytically active, it has been found, as already indicated, that lower temperatures give very desirable results. The results obtained at a given temperature will naturally vary with the specific metal halide employed. Generally speaking, in the case of catalysts impregnated or fixed on an adsorptive carbon such as activated carbon, chloroform and carbon tetrachloride are preferably fluorinated at a temperature of about 100°–200° C., and trifluoro-trichloro-ethane at about 350°–450° C. It will be understood that these temperatures are preferred temperatures for conditions and reactants described and do not represent the minimum or maximum temperatures at which reaction will occur.

The pressure under which the reaction is effected is subject to considerable variation depending largely upon the reactants, products and conditions of reaction. For the production of low boiling products the use of superatmospheric pressures may be of advantage; for the production of high boiling products the use of subatmospheric pressures may be found to be advantageous.

Superatmospheric pressures are particularly advantageous in fluorinating compounds which split off a halogen acid at elevated temperatures. Operation under superatmospheric pressure is also advantageous in that it allows a greater capacity per unit volume of catalyst.

The products of the invention find application for various commercial purposes. Thus, difluoro-dichloro-methane is widely used as a refrigerant. The new product penta-fluoro-chloro-ethane, described in Example V, also possesses very desirable properties for low temperature refrigeration. Some of the higher boiling compounds, such as trifluoro-trichloro-ethane and fluoro-trichloro-methane, are generally applicable for use as solvents or reaction media. Moreover, many of the products investigated have been found to be advantageous in that they are odorless, non-inflammable, non-corrosive and non-toxic.

The process herein described possesses many advantages of a practical and economical nature. The method of operation herein disclosed is characterized by ease of control and smoothness of operation. The types of catalyst described are in most cases easily obtainable and readily prepared. Inasmuch as these catalysts are, in general, solids at the reaction temperature, they possess many advantages over liquid catalysts previously proposed. Liquid catalysts are subject, as a general rule, to much greater loss by volatilization and in order to avoid such loss extra recovery apparatus is necessary, adding to the capital expenditure and increasing the cost of production. Supported catalysts of the character herein described are further advantageous in that the distribution of the metal halide on the support presents a relatively large catalytically active surface.

As many apparent and widely different embodiments of this invention may be made without departing from the spirit thereof, it is to be understood that we do not limit ourselves to the foregoing examples or description except as indicated in the following claims.

We claim:

1. In a process of preparing organic fluorine compounds, the step which comprises reacting together hydrogen fluoride and a compound containing an acyclic carbon atom having attached thereto a halogen other than fluorine in the presence of a metal halide on activated carbon.

2. In a process of preparing organic fluorine compounds, the step which comprises reacting together hydrogen fluoride and a compound containing an acyclic carbon atom having attached thereto a halogen other than fluorine in the presence of a heavy metal halide on activated carbon.

3. In a process of preparing organic fluorine compounds, the step which comprises reacting together hydrogen fluoride and a compound containing an acyclic carbon atom having attached thereto a halogen other than fluorine in the presence of a halide of a metal selected from groups Ib, IIb, V, VII and VIII of the periodic system carried on activated carbon.

4. In a process of preparing organic fluorine compounds, the step which comprises reacting together hydrogen fluoride and a compound containing an acyclic carbon atom having attached thereto a halogen other than fluorine in the presence of a heavy metal chloride on activated carbon.

5. In a process of preparing organic fluorine compounds, the step which comprises reacting together hydrogen fluoride and a compound containing an acyclic carbon atom having attached thereto a halogen other than fluorine in the presence of a metal halide carried on activated carbon and added halogen.

6. In a process of preparing organic fluorine compounds, the step which comprises reacting together hydrogen fluoride and a compound containing an acyclic carbon atom having attached thereto a halogen other than fluorine in the presence of a metal halide on activated carbon under superatmospheric pressure.

7. In a process of preparing fluorine compounds, the step which comprises simultaneously passing a fluorinating agent, a compound to be fluorinated and a fluorinating catalyst, in vapor phase, over activated carbon.

8. In a production of organic fluorine compounds by the vapor phase reaction of hydrogen fluoride with a compound containing an acyclic carbon atom having attached thereto a halogen other than fluorine, the step of effecting the reaction in a vessel having those portions in contact with the fluorination reaction mixture constructed from a material selected from the group consisting of chromium alloy steels and molybdenum alloy steels.

9. In a process of preparing organic fluorine compounds, the step which comprises reacting together in vapor phase hydrogen fluoride and a compound containing an acyclic carbon atom having attached thereto a halogen other than fluorine in the presence of a metal halide on activated carbon.

10. In a process of preparing organic fluorine compounds, the step which comprises reacting together in vapor phase hydrogen fluoride and a hydrocarbon containing an acyclic carbon atom having attached thereto a halogen other than fluorine in the presence of a metal halide on activated carbon.

11. In a process of preparing fluorinated alphyl hydrocarbons, the step which comprises reacting together in vapor phase hydrogen fluoride and an alphyl hydrocarbon containing a halogen other than fluorine in the acyclic portion thereof, in the presence of a heavy metal halide on activated carbon.

12. In a process of preparing fluorinated acyclic hydrocarbons, the step which comprises reacting together in vapor phase hydrogen fluoride and a halogenated acyclic hydrocarbon containing a halogen other than fluorine in the presence of a heavy metal halide carried on activated carbon.

13. In a process of preparing fluorinated acyclic hydrocarbons, the step which comprises reacting together hydrogen fluoride and a halogenated acyclic hydrocarbon containing a halogen other than fluorine in the presence of a substantially non-volatile heavy metal halide carried on activated carbon.

14. In a process of preparing difluoro-dichloro-methane, the step which comprises reacting together in vapor phase hydrogen fluoride and carbon tetrachloride in the presence of a catalyst comprising essentially ferric chloride impregnated on activated carbon.

15. In a process of preparing fluorinated acyclic hydrocarbons, the steps which comprises simultaneously passing gaseous hydrogen fluoride and a halogenated acyclic hydrocarbon containing a halogen other than fluorine through a metal halide-on-activated carbon catalyst.

16. In a process of producing fluoro-chloro-methanes, the step which comprises simultaneously passing gaseous hydrogen fluoride, carbon tetrachloride vapor and chlorine into an antimony chloride carried on activated carbon.

17. The process of producing fluoro-chloro-methanes which comprises simultaneously passing gaseous hydrogen fluoride, the vapor of a chloro-methane containing at least two chlorine atoms, and chlorine into a heated antimony chloride-on-activated carbon catalyst.

18. In a process of preparing organic fluorine compounds, the step which comprises reacting together hydrogen fluoride and a halogenated hydrocarbon containing at least one acyclic carbon atom having attached thereto at least one halogen atom other than fluorine, in the presence of a metal halide of group Ib of the periodic system carried on activated carbon.

19. In a process of preparing organic fluorine compounds, the step which comprises reacting together hydrogen fluoride and a halogenated hydrocarbon containing at least one acyclic carbon atom having attached thereto at least one halogen atom other than fluorine, in the presence of a metal halide of group V of the periodic system carried on activated carbon.

20. In a process of preparing organic fluorine compounds, the step which comprises reacting together hydrogen fluoride and a halogenated hydrocarbon containing at least one acyclic carbon atom having attached thereto at least one halogen atom other than fluorine, in the presence of a metal halide of group VIII of the periodic system carried on activated carbon.

21. In a process of preparing organic fluorine compounds, the step which comprises reacting together hydrogen fluoride and a halogenated hydrocarbon containing at least one acyclic carbon atom having attached thereto at least one halogen atom other than fluorine, in the presence of a copper chloride carried on activated carbon.

22. In a process of preparing fluorinated acyclic hydrocarbons, the step which comprises reacting together hydrogen fluoride and a halogenated saturated acyclic hydrocarbon containing a halogen other than fluorine in the presence of a substantially non-volatile heavy metal halide carried on activated carbon.

23. The process of claim 22 in which the halogenated saturated acyclic hydrocarbon contains less than three carbon atoms.

24. The process of claim 22 in which the halogenated saturated acyclic hydrocarbon is a completely halogenated saturated acyclic hydrocarbon containing less than three carbon atoms.

25. The process of producing difluoro-dichloro-methane which comprises simultaneously passing substantially anhydrous hydrogen fluoride and carbon tetrachloride through a heavy metal halide-on-activated carbon catalyst, and maintaining a reaction temperature within the range of about 100° C. to about 450° C.

26. The process of producing difluoro-dichloro-methane which comprises simultaneously passing substantially anhydrous hydrogen fluoride and carbon tetrachloride through a catalyst consisting essentially of ferric chloride on activated carbon at a temperature within the range of about 100° C. to about 200° C.

HERBERT WILKINS DAUDT.
MORTIMER ALEXANDER YOUKER.

Certificate of Correction

Patent No. 2,005,707.

June 18, 1935.

HERBERT WILKINS DAUDT ET AL.

It is hereby certified that error appears in the printed specification of the above numbered patent requiring correction as follows: Page 4, first column, line 55, strike out the formula and insert instead—

$$(Cl_2C=CCl_2);$$

and that the said Letters Patent should be read with this correction therein that the same may conform to the record of the case in the Patent Office.

Signed and sealed this 23d day of July, A. D. 1935.

[SEAL]

LESLIE FRAZER,
*Acting Commissioner of Patents.*